Figure 1:
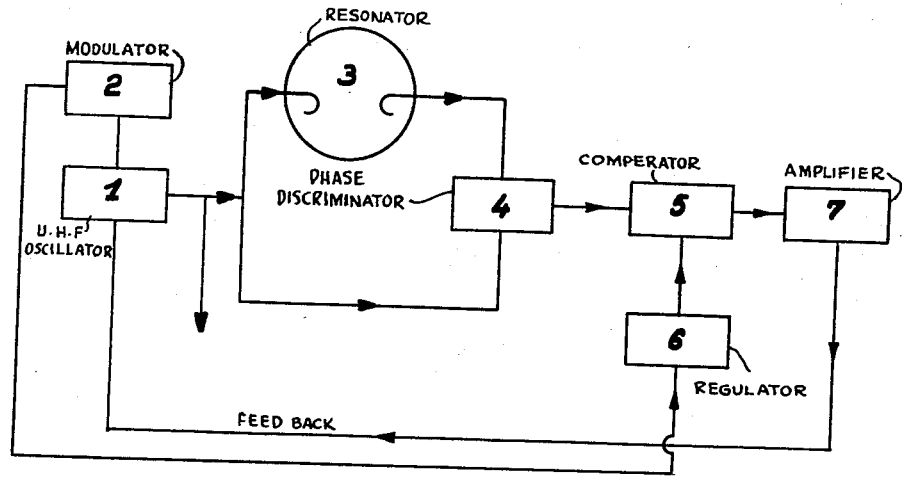

July 31, 1956

J. CAUCHOIS 2,757,340

IMPROVEMENTS RELATING TO FREQUENCY MODULATED
ULTRAHIGH FREQUENCY SYSTEMS

Filed Nov. 7, 1952

INVENTOR
JEAN CAUCHOIS
BY Haseltine Lake &b.
AGENTS

United States Patent Office 2,757,340
Patented July 31, 1956

2,757,340

IMPROVEMENTS RELATING TO FREQUENCY MODULATED ULTRAHIGH FREQUENCY SYSTEMS

Jean Cauchois, Paris, France, assignor to Compagnie Generale de Telegraphie Sans Fil, a corporation of France Application November 7, 1952, Serial No. 319,373

Claims priority, application France November 13, 1951

3 Claims. (Cl. 332—18)

This invention relates to frequency modulated ultra-high frequency circuit arrangements and more specifically to such arrangements in which an ultra-high frequency generated by an ultra-high frequency oscillating tube is modulated by applying a modulating voltage to a control electrode of said tube.

It relates more particularly to systems of this kind wherein the output of an ultra-high frequency generator is modulated in frequency in accordance with a recurrent modulating voltage-signal of variable amplitude.

There are several known types of tubes which can be frequency modulated in this way, one being the velocity modulation tube having a single cavity and a reflecting electrode widely known as the reflex klystron. In tubes of this type a variation of the voltage applied to the reflecting electrode causes the frequency of the generated oscillation to vary. Another example is the travelling wave tube which operates as an oscillator with an internal or external feedback channel which can be utilised, as known per se to modulate the frequency generated in accordance with a variable amplitude modulation signal by applying to a control electrode, a recurrent voltage having a determined amplitude-time characteristic. In certain practical applications of such frequency modulated arrangements, particularly in the case of frequency modulated radar systems it is very important that the desired law of frequency modulation be strictly followed. Indeed, the accuracy of distance determination for small distances depends directly on the accuracy with which the law is observed. However, in practice, the law of frequency modulation of oscillators such as those above referred to does not depend only on the modulating voltage applied to the control electrode, but also on the operating parameters and characteristics of the tube itself and any of a number of things can disturb the average operating point e. g. unavoidable variations in supply voltages. In practice therefore, serious departures from strict obedience to the law of frequency variation with applied modulating voltage occur and such departures may easily amount to 1% or more resulting (in radar systems) in serious errors in distance measurement.

The present invention seeks to overcome these difficulties.

According to this invention a frequency modulated ultra-high frequency arrangement comprises an ultra-high frequency oscillating tube the frequency of which can be varied by applying a voltage to a control electrode, and means for applying to said control electrode a first voltage which varies with time in accordance with a definite modulating signal and a second or error voltage which modifies the effect produced by said first voltage alone in such manner that the frequency modulation actually produced follows the modulating signal amplitude variations, said second voltage being obtained by comparing a voltage proportional to said first voltage with a voltage proportional to the frequency variation actually produced by the application of the said first voltage to said control electrode.

The voltage proportional to the frequency variation actually produced by the application of the said first voltage to said control electrode, is obtained from a linear phase discriminator to which two waves are fed, both derived ultimately from the ultra-high frequency oscillator, but one of which is phase shifted by a resonator resonant at a central frequency to an extent dependent on the departure of the frequency fed to said resonator from said central frequency.

As is known if a high frequency which varies over a narrow band extending on both sides of the resonant frequency of a cavity resonator is applied to said cavity it will shift the phase by an amount proportional to the instantaneous departure of the applied high frequency from said natural frequency. Accordingly the present invention may be carried into effect by using a cavity resonator as the resonator and the output voltage exit from the phase discriminator will be proportional to the departures of frequency of the oscillator from the resonant frequency so long as the range of frequency variation does not extend beyond a predetermined range which the resonator is designed to handle.

In one way of carrying out the invention phase discrimination is effected at ultra-high frequency by a discriminator having one input taken directly from the ultra-high frequency oscillator and the other derived from said oscillator via a cavity resonator tuned to the central frequency of oscillation.

In a preferred way of carrying out the invention, phase discrimination is effected at a lower intermediate frequency. Part of the ultra-high frequency wave from the oscillator is modulated by an intermediate frequency oscillator and fed to a resonant cavity tuned to the central frequency of one of the side bands resulting from modulation. The phase shifted output from this cavity is fed to a mixer to which output from the ultra-high frequency oscillator is also fed and the resultant is passed through an amplifier tuned to the intermediate frequency to a phase discriminator whose second input is taken from the source of intermediate frequency. The output from this discriminator is the required error voltage which is then applied, as before, to correct the ultra-high frequency oscillator.

Figure 2:
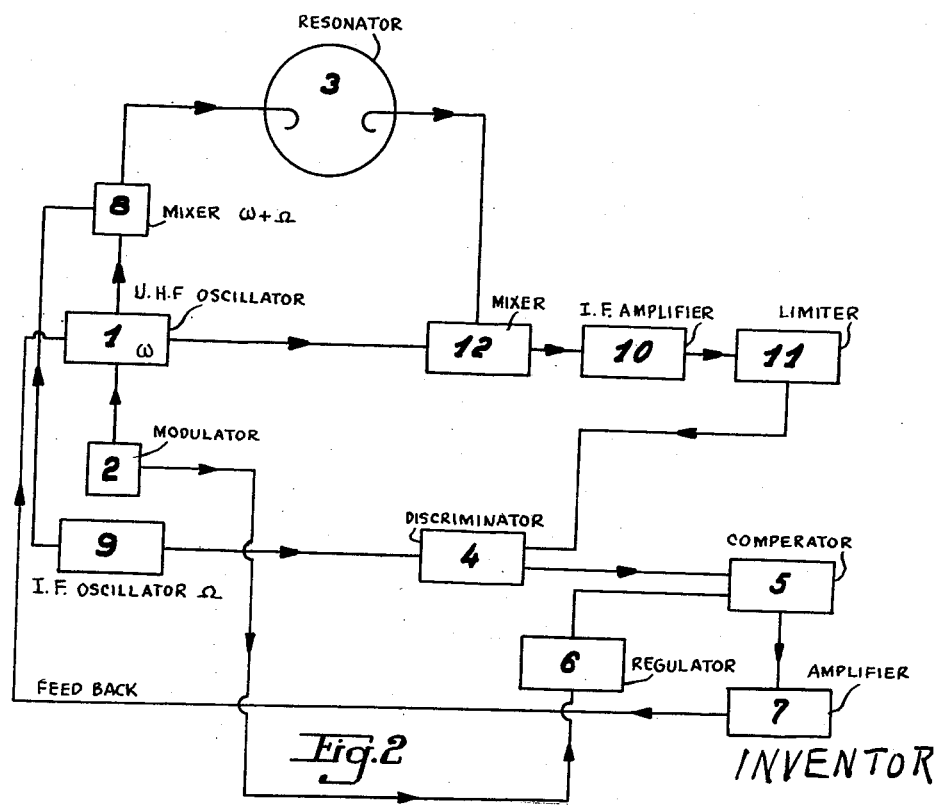

The invention is illustrated in the accompanying drawings in which:

Figure 1 is a block diagram of an embodiment using phase discrimination at ultra-high frequency, and Figure 2 is a block diagram of an embodiment using phase discrimination at intermediate frequency.

Referring to Figure 1, 1 is a high frequency oscillating tube including a control electrode and operating as above specified, for example a reflex klystron tube. This tube generates a high frequency wave, which is frequency modulated by the application to said control electrode of a recurrent voltage signal of a variable amplitude and provided by a suitable modulating device 2, known per se. The frequency of the generated wave varies around a central or mean frequency $f_0$.

Theoretically the frequency generated by the tube 1 should be proportional to the voltage applied from the modulator 2 but, in actual practice, as explained above, this does not happen.

In accordance with this invention some of the produced high frequency energy is branched off to excite a cavity resonator 3, tuned to the central frequency $f_0$. Then, by coupling in known manner to the cavity, there is obtained a high frequency wave which is phase shifted in relation to the exciting wave by a quantity $\varphi$ which is proportional to $\Delta f(t)$, where $\Delta f(t)$ is the instantaneous value of the departure of the mean frequency of the tube 1 from the frequency $f_0$. It is assumed that the design of the cavity resonator is such (i. e. its Q value is such) that it will operate at all frequencies in the band of frequency modulation band in question. The phase shifted wave from the cavity is fed into a phase discriminator 4 the other input of which is connected directly to the tube 1 i. e. with no or negligible phase shift. At the output of the discriminator is obtained a voltage proportional to $\Delta\varphi$, or to $\Delta f(t)$, i. e. proportional to the instantaneous departure of the frequency produced by the tube with regard to the frequency $f_0$.

This voltage is fed to a comparison circuit 5 where it is compared with a reference voltage produced by a device 6 associated with the modulator 2, said reference voltage being proportional to the voltage generated by device 2. The ratio of the voltage from device 6 to that from device 2 is chosen in dependence on the physical characteristics of the cavity and in particular on the ratio $$K = \frac{\Delta\varphi}{\Delta f(t)}$$

as well as on the characteristic voltage phase of the discriminator.

The voltage developed in the circuit 5, representing the error signal, is amplified suitably in the amplifier 7, and fed then back to the control electrode of the tube 1, so as to vary the modulating voltage applied to said electrode to such an extent as to maintain the frequency modulation in linear relationship with the initial modulating voltage supplied by the device 2.

Phase discriminators for use on ultra-high frequency are known but they are difficult to build and adjust.

Figure 2 shows an improved arrangement according to the invention wherein phase discrimination is not effected at ultra-high frequency (i. e. at a frequency of the order of 1,000 mc./s.) but at a much lower frequency of the order of only tens of mc./s.

In Figure 2 the same references designate the same elements as in Figure 1. Here again 1 is an oscillating tube having a recurrent modulating voltage presenting a definite amplitude-time characteristic and which is supplied by the modulator device 2.

As in Figure 1 a portion of the high frequency energy generated by tube 1 branched off and amplitude modulated in a crystal mixer 8 by an intermediate frequency from a local oscillator 9. The modulated wave thus obtained is fed to a cavity resonator 3, which is tuned to the central frequency of one of the modulation side bands, i. e. to the sum or difference of the central frequency of the high frequency oscillator and the frequency of the local oscillator 9. The cavity is so designed that it will pass only the chosen side band.

Let $A_0$ and $\omega$ be respectively the amplitude and the angular frequency of the non-modulated wave produced by the high frequency oscillating tube 1 and let $\Omega$ be the frequency of the wave generated by the oscillator 9. The output from the cavity 3 will include the chosen single side band phase shifted by an amount $\varphi$ which is proportional, as in the case of Figure 1, to $\Delta f$. The expression for the output from cavity 3 is:

$$A_1 \sin[(\omega+\Omega)t+\varphi]$$

This wave is mixed in a crystal 12 with the wave $A_0 \sin \omega t$ from tube 1. The crystal 12 will thus produce:

$$\{A_0 \sin \omega t A_1[\sin(\omega+\Omega)t+\varphi]\}^2$$

or $$A_0{}^2 \sin{}^2\omega t + A_1{}^2 \sin{}^2[(\omega+\Omega)t+\varphi] + 2A_0 A_1 \sin \omega t \sin[(\omega+\Omega)t+\varphi]$$

It will be noted that the doubled term $2A_0A_1 \ldots$ etc. includes the term $\sin(\Omega t+\varphi)$ the phase shift $\varphi$ being thus present in the intermediate frequency.

The output from crystal mixer 12 is fed to an intermediate frequency amplifier 10 tuned to the intermediate frequency $\Omega$, and which accordingly passes only the term $\sin(\Omega t+\varphi)$. The amplified intermediate frequency is applied to a limiter 11 which in turn supplies one input to an intermediate frequency phase discriminator 4, the second input to which is applied direct from the intermediate frequency oscillator 9. The output from this discriminator is a voltage proportional to the phase shift $\varphi$ introduced by the cavity resonator 3 in the high frequency wave. The rest of Figure 2 is identical with Figure 1.

I claim:

1. System for generating frequency modulated ultra-high frequency oscillations comprising, in combination: an ultra-high frequency oscillator; a source of modulating recurrent signal voltage of variable amplitude associated with said oscillator, so as to modulate its frequency in accordance with its amplitude variation, means for converting the modulated output of said oscillator into a frequency modulated signal phase shifted in accordance with said frequency modulation; means for transforming said phase shifted signal into a variable amplitude voltage signal in accordance with said phase shift; means for comparing said variable amplitude voltage signal with a signal proportional in amplitude to said modulating recurrent signal voltage controlling the oscillator and for producing thereby an error signal representative of any instantaneous amplitude difference therebetween; and means for applying said error signal to said oscillator for correcting any accidental drift in the frequency thereof.

2. System for generating frequency modulated ultra-high frequency oscillations comprising, in combination: an ultra-high frequency oscillator; a source of modulating recurrent signal voltage of variable amplitude associated with said oscillator, so as to modulate its frequency in accordance with its amplitude variation an ultra-high frequency resonator tuned to a frequency chosen within the operating frequency range of said oscillator, means for applying to said resonator a portion of the frequency modulated output of said oscillator thereby to produce frequency modulated oscillations phase shifted in accordance with the frequency modulation of said oscillator, a phase discriminator connected to said resonator and to said oscillator, receiving thereby said phase shifted frequency modulated signal and said frequency modulated signal and producing thereby a variable amplitude voltage signal responsive to said phase shift means for comparing said variable amplitude voltage signal with a signal proportional in amplitude to said modulating recurrent signal voltage controlling the oscillator and for producing thereby an error signal representative of any instantaneous amplitude difference therebetween; and means for applying said error signal to said oscillator for correcting any accidental drift in the frequency thereof.

3. System for generating frequency modulated ultra-high frequency oscillations comprising, in combination: an ultra-high frequency oscillator; a source of modulating recurrent signal voltage of variable amplitude associated with said oscillator, so as to modulate its frequency in accordance with its amplitude variation means for supplying oscillations of intermediate frequency, means for mixing said oscillations with the frequency modulated output of said oscillator, so as to produce an amplitude modulated ultra-high frequency signal in accordance with said intermediate frequency; a resonator device tuned to a frequency chosen within one side band of the frequency range of said last named amplitude modulated signal; means for applying said latter signal to said resonator to produce frequency modulated oscillations phase shifted in linear relation with the frequency modulation of said oscillator, means for mixing said phase shifted and frequency modulated oscillations with oscillations supplied directly from said ultra-high frequency oscillator to produce oscillations of intermediate frequency phase shifted in accordance with said frequency modulation; a phase discriminator receiving said intermediate frequency phase shifted oscillations and the unmodulated intermediate frequency signal from said supply of intermediate frequency oscillations and producing thereby a variable amplitude voltage responsive to said phase shift, applied to abovenamed comparing means, means for comparing said variable amplitude voltage signal with a signal proportional in amplitude to said modulating recurrent signal voltage controlling the oscillator and for producing thereby an error signal representative of any instantaneous amplitude difference therebetween; and means for applying said error signal to said oscillator for correcting any accidental drift in the frequency thereof.

References Cited in the file of this patent

UNITED STATES PATENTS

| | | |
|---|---|---|
| 2,316,017 | Peterson | Apr. 6, 1943 |
| 2,462,857 | Ginzton et al. | Mar. 1, 1949 |
| 2,469,218 | Thomas | May 3, 1949 |
| 2,570,758 | Braden | Oct. 9, 1951 |
| 2,692,947 | Spencer | Oct. 26, 1954 |